(12) United States Patent
Brueckner et al.

(10) Patent No.: US 8,640,238 B2
(45) Date of Patent: Jan. 28, 2014

(54) FIGHT-THROUGH NODES FOR SURVIVABLE COMPUTER NETWORK

(75) Inventors: Stephen K. Brueckner, Ithaca, NY (US); Kenneth J. Thurber, Hopkins, MN (US)

(73) Assignee: Architecture Technology Corporation, Minneapolis, MN (US)

( * ) Notice: Subject to any disclaimer, the term of this patent is extended or adjusted under 35 U.S.C. 154(b) by 197 days.

(21) Appl. No.: 13/352,148

(22) Filed: Jan. 17, 2012

(65) Prior Publication Data

US 2013/0067574 A1  Mar. 14, 2013

Related U.S. Application Data

(60) Provisional application No. 61/534,817, filed on Sep. 14, 2011.

(51) Int. Cl.
*G06F 11/00* (2006.01)

(52) U.S. Cl.
USPC .......................................................... 726/23

(58) Field of Classification Search
USPC ................ 726/22, 23; 713/151–153; 709/224
See application file for complete search history.

(56) References Cited

U.S. PATENT DOCUMENTS

| | | | |
|---|---|---|---|
| 7,076,801 B2 | 7/2006 | Gong et al. | |
| 7,350,234 B2 | 3/2008 | Goseva-Popstojanova et al. | |
| 7,607,129 B2 * | 10/2009 | Rosu et al. | 718/1 |
| 8,510,747 B2 * | 8/2013 | Tian et al. | 718/105 |
| 2009/0313620 A1 * | 12/2009 | Sedukhin et al. | 718/1 |
| 2010/0043073 A1 * | 2/2010 | Kuwamura | 726/24 |
| 2010/0269167 A1 * | 10/2010 | Kashima | 726/7 |

OTHER PUBLICATIONS

Leech et al., "Socks Protocol Version 5," Network Working Group, RFC:1928, Mar. 1996, 9pp.
Duren, "Organically Assured and Survivable Information Systems (OASIS) Technology Transition Assessment (OTTA)," Defense Advanced Research Projects Agency, DARPA Order No. K128, N684m P004, Mar. 2004, 56 pp.
Maftia, "Malicious-and Accidental-Fault Tolerance for Internet Applications," IST Research Project IST-1999-11583, retrieved at http://spiderman-2.laas.fr/TSF/cabernet/maftia/index.html, Jan. 1, 2000-Feb. 28, 2003, 2 pp.
Reiser et al., "VM-FIT: Supporting Intrusion Tolerance with Virtualisation Technology," retrieved from http://wraits07.di.fc.ul.pt./9.pdf, Proceedings of the 1st Workshop of Recent Advances on Intrusion-Tolerant Systems, Mar. 23, 2007, 5 pp.

(Continued)

*Primary Examiner* — Beemnet Dada
(74) *Attorney, Agent, or Firm* — Shumaker & Sieffert, P.A.

(57) ABSTRACT

A survivable network is described in which one or more network device includes enhanced functionality to fight through cyber attacks. A Fight-Through Node (FTN) is described, which may be a combined hardware/software system that enhances existing networks with survivability properties. A network node comprises a hardware-based processing system having a set of one or more processing units, and a hypervisor executing on each one of the processing units; and a plurality of virtual machines executing on each of the hypervisor. The network node includes an application-level dispatcher to receive a plurality of transaction requests from a plurality of network communication session with a plurality of clients and distribute a copy of each of the transaction requests to the plurality of virtual machines executing on the network node over a plurality of time steps to form a processing pipeline of the virtual machines.

8 Claims, 6 Drawing Sheets

(56) References Cited

OTHER PUBLICATIONS

Shi et al., "An Intrusion-Tolerant and Self-Recoverable Network Service System Using a Security Enhanced Chip Multiprocessor," retrieved from http://users.ece.gatech.edu/~leehs/pub/icac05.pdf, Second International Conference on Autonomic Computing (IAC 2005), Jun. 13-16, 2005, 11 pp.

Alberts et al., "Mission Assurance Analysis Protocol (MAAP): Assessing Risk in Complex Environments," retrieved from http://www.sei.cmu.edu./reports/05tn032.pdf, Sep. 2005, 59 pp.

Bargar, "DOD Global Information Grid Mission Assurance," CrossTalk, The Journal of Defense Software Engineering, retrieved at http://www.crosstalkonline.org/storage/issue-archives/2008/200807/200807-Bargar.pdf, Jul. 2008, 3 pp.

Department of Defense Instruction, "Information Assurance (IA) Implementation," retrieved from http://www.dtic.mil/whs/directives/corres/pdf/850002p.pdf, Feb. 6, 2003, 102 pp.

Reynolds et al., "The Design and Implementation of an Intrusion Tolerant System," IEEE Proceedings of the International Conference on Dependable Systems and Networks (DSN'02), 2002, 6 pp.

* cited by examiner

FIGHT-THROUGH NODES FOR SURVIVABLE COMPUTER NETWORK

This application claims the benefit of U.S. Provisional Application Ser. No. 61/534,817, filed Sep. 14, 2011, the contents of which are hereby incorporated by reference.

TECHNICAL FIELD

The invention relates to computer networks and, more specifically, detection and recovery from network attacks.

BACKGROUND

Despite existing security efforts, computer networks are susceptible to attack and compromise. Complete isolation of a network or system provide by the network may not always be an acceptable response to a detected cyber attack.

SUMMARY

The techniques allow for a "survivable network" in which one or more network device may be able to "fight through" cyber attacks. This may be of particular critical network operations. The techniques provide for a "survivable" network that may be capable of carrying on, in a perhaps degraded state, during an attack so as to continue to provide critical services. Because human reaction times can be very slow in comparison to the speed of cyber attacks, the survivable system may be utilized to provide an automated response capability so the network can dynamically respond to threats.

A Fight-Through Node (FTN) is described herein, which may be a combined hardware/software system that enhances existing networks with survivability properties. The Fight-Through Nodes may replace existing nodes within the network, such as nodes hosting critical services in a network. Example nodes include database servers, information systems, application servers, email servers, FTP servers, web servers or even network infrastructure such as layer three routers or layer two switches, firewalls, intrusion detection system, gateways or the like. Networks equipped with FTNs as described here may be resilient, enabling critical processes to operate despite attacks on the node or impacts on other parts of the network.

As enterprises rely ever more heavily on their information systems, the frequency and sophistication of cyber attacks continues to rise. The techniques described herein improve the survivability of a network's critical server nodes, making it possible to fight through cyber attacks. Rather than being disabled by such attacks, servers providing critical services will continue to operate in spite of the attack. Entities may use the FTNs described herein to replace critical nodes their network or information systems. The assurance provided by the FTNs may be applicable to a variety of industries having critical systems (e.g., utilities, health care, financial services, transportation, military, telecom, retail, information technology).

In one example, a network node comprises a hardware-based processing system having a set of one or more processing units, and a hypervisor executing on each one of the processing units; and a plurality of virtual machines executing on each of the hypervisor. The network node includes an application-level dispatcher to receive a plurality of transaction requests from a plurality of network communication sessions with a plurality of clients and distribute a copy of each of the transaction requests to the plurality of virtual machines executing on the network node over a plurality of time steps to form a processing pipeline of the virtual machines.

A method comprises receiving, with a network node, a plurality of transaction requests from a plurality of network communication sessions with a plurality of clients, and distributing a copy of each of the transaction requests to a plurality of virtual machines executing on the network node over a plurality of time steps to form a processing pipeline of the virtual machines. The method further comprises, upon distributing a threshold number (n) of the transaction requests to the plurality of virtual machines, detecting whether any of the virtual machines in the processing pipeline has been compromised. When none of the virtual machines in the processing pipeline has been compromised, the processing pipeline of virtual machines are checkpointed by recording a state for each of the plurality of virtual machines. When at least one of the virtual machines in the processing pipeline has been compromised, the compromised virtual machines may be removed from the processing pipeline.

The techniques provide improved survivability in networks via technologies enhancing likelihood of continuity and transaction completion, allowing network operation to persist under conditions of extreme attack and/or degraded performance.

Architectural and operational strategies are described that may ensure survivability, resiliency, and adaptability to "fight through" severe cyber degradation and compromise, and to make the adversary's job harder and more costly. The techniques described herein may strengthen cyber readiness in a contested and degraded cyber operational environment, providing a set of automated capabilities to respond dynamically to escalating threats. The techniques may include but are not limited to: employment of application execution/database transaction sandboxes to check results before actual execution, business-unit failover to change entire suites of critical processes when compromise/failure occurs.

DETAILED DESCRIPTION

A Fight-Through Node (FTN) is described, which is a hardware/software system to enhance networks with survivability properties. In some example, not all nodes in a network are equally important. In many large-scale networks, some nodes are immediately critical to success whereas other nodes play a secondary role. Network nodes that host one or more essential services may be viewed as critical nodes that may be good candidates for to utilize the techniques described herein to achieve increased resiliency to network attacks.

Figure 1:
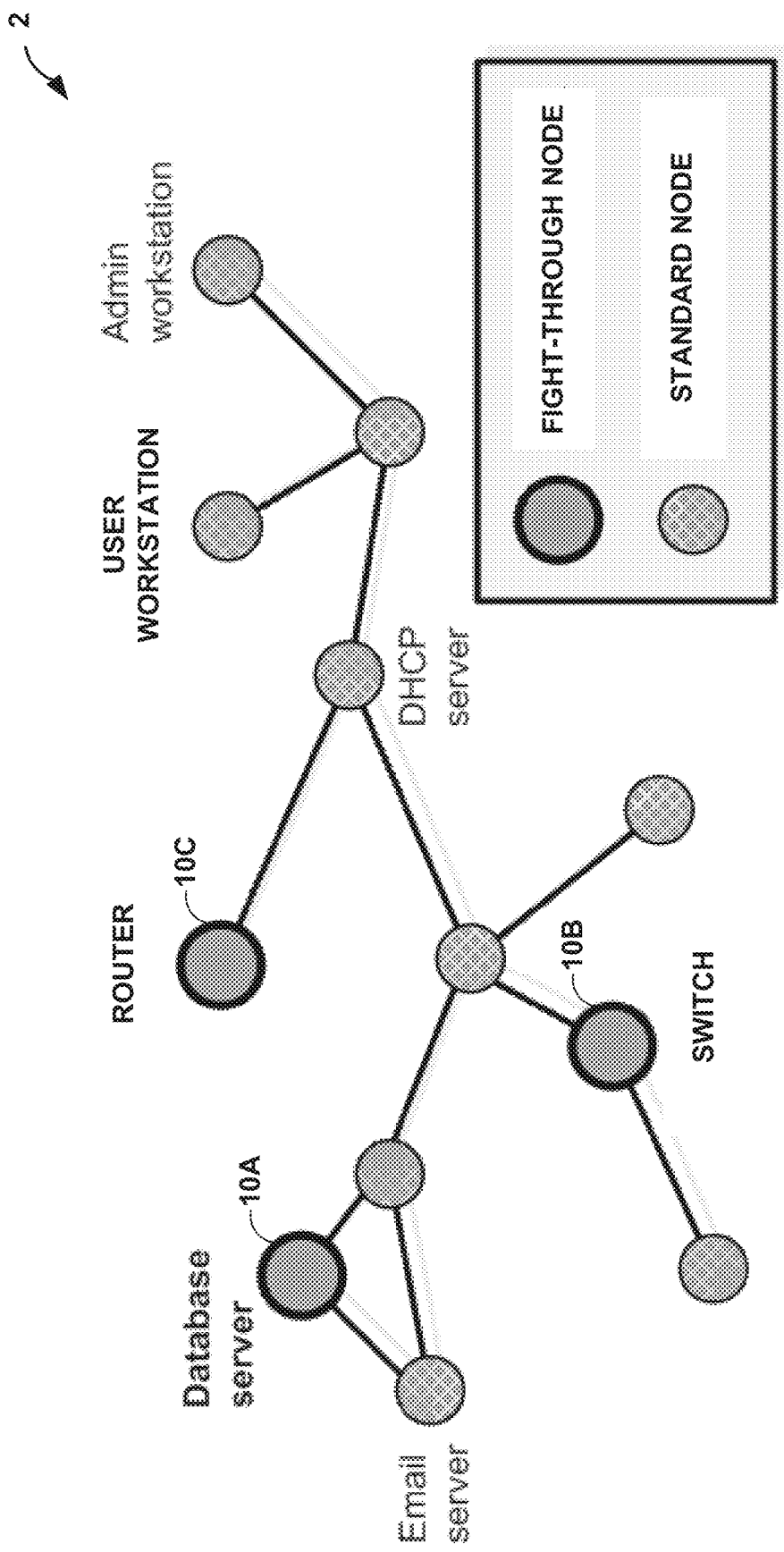
FIG. 1 is a network diagram showing an example network having fight-through nodes with survivability properties for resiliency to network attacks.

FIG. 1, for example, illustrates an example network 2 in which three nodes 10A, 10B and 10C ("nodes 10") have been identified as critical for the operation of data analysis and dissemination. Without operation of nodes 10, for example, network 2 may not be able to provide any level of service; conversely, a network with only these nodes may be able to provide at least a minimal amount of service. FIG. 1 is an example and the techniques herein may be applied to fewer or more nodes, such as all nodes within a network.

A Fight-Through Node (FTN) is described that may be used to replace nodes in a network. Networks equipped with FTNs may have increased resiliency, enabling critical processes to operate despite attacks on the node or impacts on other parts of the network. In some embodiments, an FTN is a hardware-based solution with customized software, e.g., a small rack of servers executing the software, used to replace an existing operation-critical server or workstation.

FTNs are resilient to attacks, operate reliably despite compromise (to a threshold level), and can be easily re-deployed after being irretrievably compromised. The methods used to achieve these capabilities may include redundancy, sandboxing, synchronization, checkpointing, and restoration. While survivable against network attacks such as denial-of-service, the FTN's design is particularly effective against more insidious host-based attacks; i.e. attacks that compromise a server or workstation.

FTN's operation captures the running state of a program (and its storage) between discrete Input/Output (I/O) transactions. The FTNs extends this transaction concept to other programs including services and types of network accesses such as sessions.

In one example, each FTN 10 contains a set of one or more processing units (e.g., blades) executing hypervisors that provide an operating environment for an ordered group of n (where n is an arbitrary number) cloned Virtual Machines (VMs). These VMs host the node's service(s) and act as transaction sandboxes. Incoming transaction requests are dispatched to the first worker VM in this group. After each transaction completes, the next VM in the chain is synchronized with the previous one, resulting eventually in an active record of the previous n transactions. That is, only the oldest transaction in the series will have been executed on the last VM, and all n transactions of the series will have been executed on the first VM. After n transactions are complete, incoming transactions are temporarily suspended while the integrity of the VMs is checked with an Intrusion Detection System (IDS). If the VMs remain uncompromised, all VMs within the processing pipeline are backed up, or checkpointed, a control unit connected via a privileged LAN and then the next n transactions are processed by the dispatcher. If after the set of n transaction any VMs are compromised, the control unit instructs the hypervisors to automatically isolate the compromised VMs and saves their state for later forensic analysis. The control unit directs the hypervisors to immediately start replacement VMs from a warm backup, i.e., the most recent checkpoint, and insert into the processing pipeline of VMs in place of the compromised VMs. The source of the transaction that caused the compromise is (optionally) blocked at the FTN's firewall to prevent re-infection. In this way, upon detecting one or more compromised VMs, the compromised VM are isolated from the pipeline.

Example

Suppose that, in a network without FTNs, an attacker uses a database transaction to trigger a zero-day exploit that compromises a database server and its hot standby server, which was susceptible to the same exploit because it had been mirroring transactions. The attacker, for example, may install a rootkit onto both machines, allowing the attacker to launch a variety of denial-of-service (DoS) or stealthy data-centric attacks against the data. In the conventional network, the presence of the rootkit is immediately detected, but the servers must either be taken offline for repair or allowed to run while under control of the attacker. Neither choice is acceptable.

By converting the database server to an FTN, the attack is neutralized and operations can safely continue. The compromise and rootkit are isolated within one or more of the FTN's sandbox VMs. The compromised VMs are rolled back to clean images from warm checkpoints and the FTN continues to service incoming transaction requests. The compromised VMs' disks and memory states are provided to a response team for forensic analysis, so the exploit can be characterized and the vulnerability patched. The source address of the malformed transaction is blocked at the FTN's firewall, preventing re-infection from that vector.

FTNs may provide a variety of features. As one example, the FTN may use sandbox VMs to isolate cyber attacks and prevent them from affecting other systems on the network. Meanwhile, the service offered by the FTN continues to run on unaffected VMs. The FTNs may be easily to install and deploy in existing environment. For example, one embodiment of an FTS may utilize a rack of commodity servers that can run the same software as existing servers. FTNs can therefore either replace or shadow existing transaction-based servers on networks. As another example, the FTNs may automatically respond in real-time to cyber attacks. When attacked, FTN automatically shuts down affected VMs and restores them from recent backups. It also reconfigures its internal firewall to block source of attack.

Figure 2:
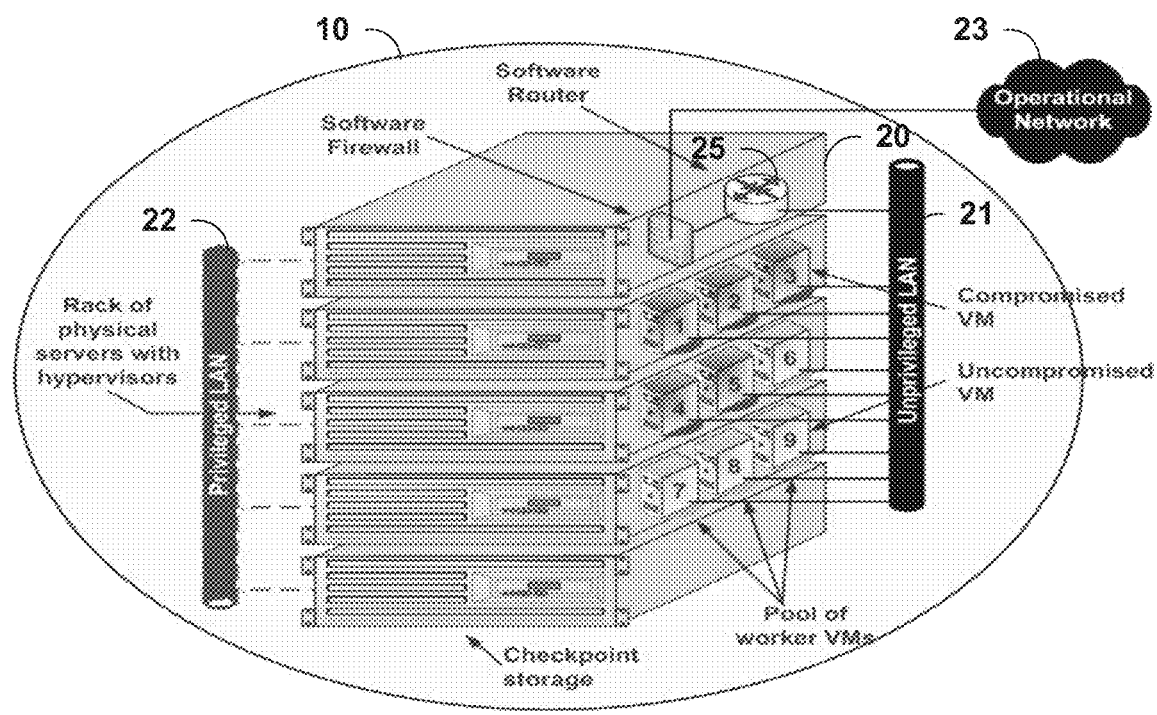
FIG. 2 is a schematic diagram illustrated in example in which, physically, a FTN is a small rack of servers connected by two networks.

FIG. 2 is a schematic diagram illustrated in example in which, physically, a FTN 10 is a small rack of servers 20 connected by two networks 21, 22. FIG. 2 illustrates the VMs hosted by a server. As shown, the FTN includes an ordered group of "worker" VMs (1-9) that execute transaction requests from the operational network. Although there are nine worker VMs shown in FIG. 2, the system can scale to provide fewer or more VMs to improve performance. The worker VMs are regularly monitored for compromise with an IDS. When they are "clean" they are backed up and when they are "dirty" (i.e., compromised) they are restored from a recent (warm) clean backup, effectively isolating and removing the compromised version of the VM from the pipeline. The FTN maintains service when attacked by verifying post-transaction integrity using VMs as sandboxes, and by eliminating compromised worker VMs and replacing them with fresh ones.

In one example, the FTN has a single address on the operational network 23. A firewall and a software router, referred to herein as a dispatcher, mediates between the worker VMs and the operational network 23. The firewall provides an adaptable first line of defense for the FTN; when an attack is detected the firewall can be automatically reconfigured to block future attacks from the same source after the worker VMs are restored. The dispatcher 25 stores and forwards transaction requests and responses. That is, dispatcher 25 forwards transaction requests from clients to the worker VMs. The dispatcher may mirror transactions across the worker VMs, but not to all workers VM simultaneously (as discussed below). Dispatcher 25 instead sequentially deploys copies of the transaction in a delayed fashion to the worker VMs so as to establish a processing pipeline of VMs working on the same transactions, e.g., from the same network communication session or from sessions with multiple clients. Dispatcher 25 forwards delayed, unified responses from the worker VMs back to clients after waiting to determine whether transactions were attacks or not (avoiding the problem of "rolling back" the clients). By forwarding transaction messages to the VMs serially, dispatcher 25 forces the VMs' services into deterministic behavior, avoiding the complication of race conditions between simultaneous requests.

There are a number of potential strategies for using the pool of sandbox VMs 1-9 to balance FTN resiliency with performance. One example is to line them up into a "processing pipeline," in which each transaction is executed on each VM but in a different time step. That is, the first transaction is executed on VM1, then during the next "time step" the first transaction is executed on VM2 while the second transaction is executed on VM1. When the first transaction in a sequence is executed on the final VM (i.e., a set of n transactions have been loaded into the queue of n VMs), all of the VMs are paused, checked for evidence of attack, and restored as needed. If none are compromised, the entire state of the set of VMs is checkpointed at the same time. This process is repeated after deploying another set of n transaction to the VMs. This pipeline approach allows the FTNs to perform the security checks and create backups less frequently (rather than after every transaction, after every n transactions where n is the number of VM workers), yet still provides a set of discrete checkpoints that are only one transaction apart so the dispatcher can "roll back" the FTN to the appropriate point.

The clean checkpoints of all VMs are stored on the checkpoint server. In one example, this host is not connected to the VMs, but rather to the hypervisors hosting the VMs on a privileged network. The FTN's critical processes (synchronization, integrity checking, checkpointing, and restoration) are executed by the hypervisors as directed by the control module, so that under normal operation (which includes "normal" attacks; i.e., attacks on processes or their operating systems) the critical processes are safe from compromise. In the unlikely event that an attacked VM escalates privilege and compromises its hypervisor, the entire FTN must be restored from a cold backup, i.e., its initial configuration. This restoration would involve swapping the hard drives of the physical servers, which requires manual intervention but can be still accomplished within minutes. The compromised hard drives would be made available to a response/forensics team for analysis.

The operation of an FTN utilizes one or more intrusion detection systems (IDSs). For the case of an attack on service availability, (a network or host-based DoS), a DoS that is not easily detectable is a rather ineffective attack and does not require resiliency. More subtle is an attack that quietly compromises a node for the purpose of stealthily exfiltrating or altering data. IDSs detecting such stealthy attacks exist, and the FTN may be used with such an IDS to detect attacks on a node's confidentiality and integrity. Because the FTN's server hypervisors may have a higher level of privilege than the VMs, IDSs executed from the hypervisors may provide FTNs with a higher level of assurance than typical IDSs executing within the VMs could achieve.

The architecture of the FTNs is configured to operate on a per transaction basis. Synchronization, checkpointing, and restoration within FTNs may be driven by breaking down I/O of a service (e.g., communication sessions such as FTP, HTTP or the like) into discrete transactions. The simplest types of transactions involve the exchange of a single pair of messages; for example a database commit request and acknowledgement of success or an HTTP GET request and content-filled response. Net-centric Service Oriented Architectures (SOAs), as well as much of the Internet at large, follow this paradigm.

Since dispatcher 25 performs synchronization using service-level transactions, it is able to define and detect transactions at the application level of the network stack. Dispatcher 25 may extract higher-level semantics from the lower layers of the stack, such as the transport layer (TCP packets). Such extraction may be protocol-specific, and possible for any discrete messaging protocol with a known specification. Messages may be sent as text (e.g., web service SOAP/XML messages) or as programmatic data structures (e.g., Java RMI data objects), and FTNs may support both.

In one example, dispatcher 25 is a transaction router executing within a VM that presents the outside network with a single interface to the FTN, accepts incoming transaction requests from clients, individually forwards them to the worker VMs in the pipeline, and sends transaction responses back to the clients. Dispatcher 25 is transaction-aware for the specific service(s) its FTN is providing. Dispatcher 25 provides a store-and-forward component for transactions that sends transaction requests to the worker VMs after each synchronization time step, and responses to clients can only be sent after the IDS verifies worker VM integrity post-transaction. The store-and-forward mechanism may occur at the application level (i.e., layer 7 and up); that is, it may accept and acknowledge the multiple TCP packets that constitute a single transaction message in accordance with the application-layer protocol. In addition, software-encrypted sessions may be handled at the application level. In this case, the dispatcher may act as a proxy, making encrypted connections with clients rather than the individual worker VMs doing so. Hardware encryption would be orthogonal, and therefore straightforward to accommodate.

When a worker VM becomes compromised, that VM and all preceding VMs in the pipeline (VMs that have executed transaction subsequent in time to the transactions executed by the compromises VM) are reconstituted. This recovery process may start with promotion of the most up-to-date "clean" VM to the front of the pipeline and proceeds with identifying which warm checkpoints to use for reconstitution.

A survivability threshold of an FTN may be applied; i.e., the level of attack and/or compromise may be determined and compared to a threshold before the FTN is taken offline and reconstituted from a cold backup.

Each FTN worker VM may have an independent disk image containing its operating system and services. For nodes requiring large amounts of data storage, the worker VMs may be connected to a single storage array. A trade-off must be made between resources and security for these types of nodes. A centralized storage may save on hardware, space, and power requirements, but may only protect against compromise of the VMs' OS and processes. This still presents considerable protection because it severely limits the actions an attacker can take. Alternatively, data storage may be replicated on independent disks for all VMs, which requires more resources but provides additional protection against data corruption and theft. In this case, checkpointing may occur for each VMs' disk space.

The system may be configurable between the number of worker VMs and the frequency of integrity checks. This allows an administrator to manage the trade-off between resources and performance. The factors affecting performance include (1) the time between periodic IDS checks/checkpointing, (2) the processing time required for the IDS checks/checkpointing, and (3) the transaction latency introduced by the depth of the worker VM pipeline. More worker VMs improves performance in the first two cases, but degrades it in the third case. In all cases, additional VMs require additional hardware, space, and power.

In addition, an administrator may configure a level of the IDS checks (security) so as to control the time requirement for the integrity checks (performance). At the simplest level, the IDS may be configured to only checks for DoS attacks by verifying that the VM's critical service is still running and available; this would be a quick check. At a higher level, the IDS may be configured to look for malware in the VM's RAM or disk; this would take longer but defend against more subtle threats.

In some embodiment, dispatcher 25 may include functionality of an Application-Level Gateway (ALG) that operates at the network layer. That is, an ALG is a type of proxy that dynamically helps certain applications work through firewalls and NAT connections. To do this, the ALG understands the protocols used by the applications it supports. It may perform deep packet inspection to set up ephemeral ports, routes, and connections based on the incoming protocol being used.

The FTN dispatcher 25 may extend the functionality of the ALG by supporting simple text protocols such as HTTP and FTP but also a variety of protocols. The dispatcher may set up connections between clients and servers, and also extract, store, and forward transaction messages itself rather than simply set up connections for pass-through communications. Finally, to support protocols that can only be understood at the session or application layer, the FTN dispatcher may operate as a proxy, making its own connections to both the client and server.

For example, to handle encrypted (SSL) sessions by tunneling the connection, or by using the SOCKS protocol [http://tools.ietf.org/search/rfc1928], dispatcher 25 may operate as a proxy. In this case, dispatcher 25 may be provided a server key for the worker VMs and make the connection to clients. It could then either forward the encrypted packets, or create decrypted (plaintext) packets to forward to the worker VMs.

In one example, the dispatcher serializes transactions to a single pipeline of VMs to simplify synchronization. Alternatively, the dispatcher may parallelize some types of transactions (e.g., read-only transactions)

The worker VMs are backed up, or checkpointed, after the periodic IDS scans. The VM's memory and disk image may be written to files. In some cases, much of a VM's RAM may already stored on disk in swap space, and Copy-on-Write (CoW) disk images only store the differences between a file system's shutdown state and its active one. These two factors may be used to reduce the time required to create a checkpoint.

A simple write of VM state as described above is called a "discard" checkpoint. Periodically the FTN could perform "merge" snapshots, which merge the CoW differences from a discard snapshot to a previous snapshot or the original disk image. This would reduce the number of stored snapshots. Another alternative is to just throw away discard snapshots as they age, but this may cause discontinuities in live data. The types of snapshots available and their age could be primary factors in determining which snapshots to restore after one or more worker VMs are compromised.

VMs may become compromised yet remain undetected for an extended period. To address this problem, VMs could be periodically restored from a cold, but known to be clean, backup. This technique is called proactive recovery. Such a technique may be simpler to implement in the case where worker VMs all tie in to a common database; the VMs could be refreshed without disrupting the results of their transactions. This technique would be more difficult to apply, when all VMs and their storage is fully replicated, without losing the database's state changes.

In one example, FTNs are used with respect to application-level database transactions using a distributed storage model; that is, each worker VM in the FTN has its own database. The FTN's internal state can be synchronized with that of the operational network on which it resides, and the FTN can recover from a host-based denial of service attack.

Figure 3:
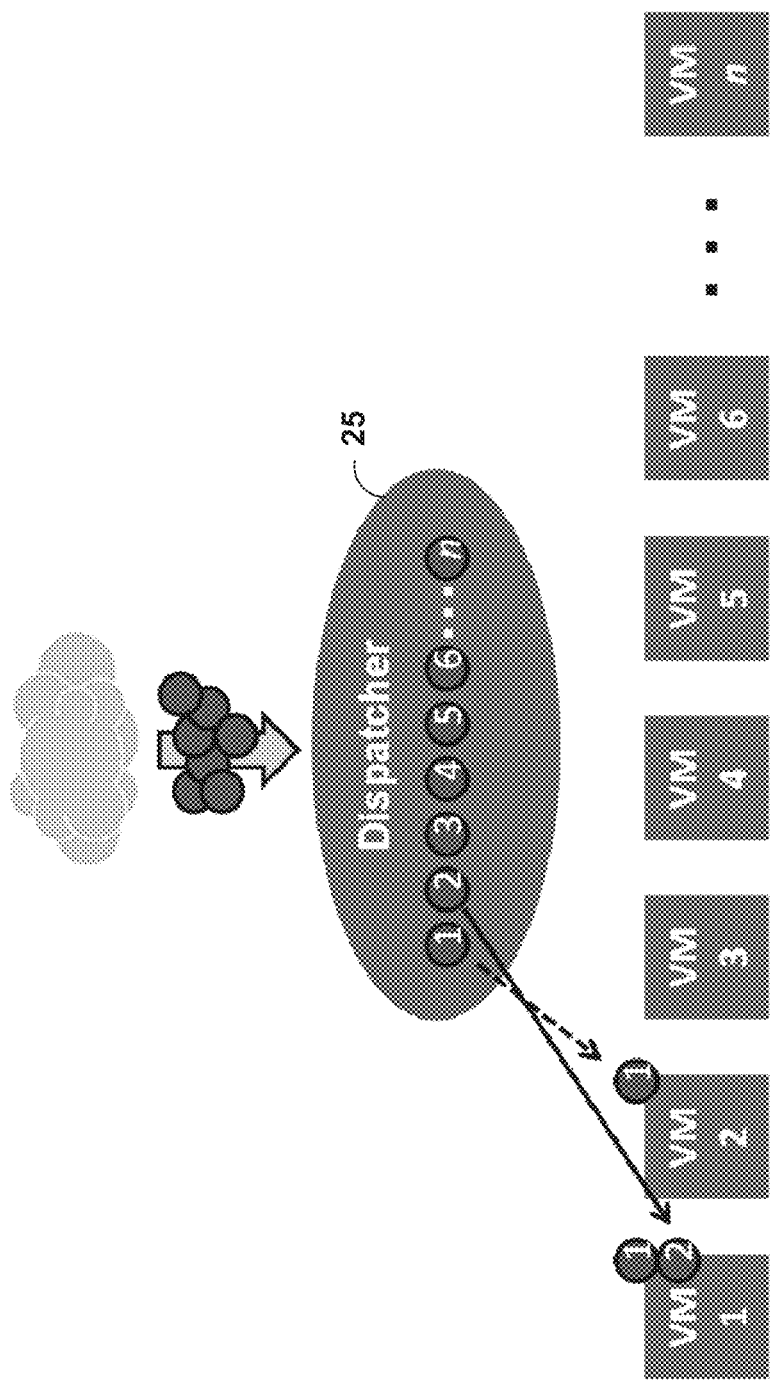
FIG. 3 is a diagram illustrating a dispatcher within a FTN dispatching initial incoming transaction requests (#1, #2) to a first few worker VMs (1, 2) in a group of n virtual machines.

FIG. 3 is a diagram illustrating dispatcher 25 dispatching initial incoming transaction requests (#1, #2) to the first two worker VMs (1, 2) in a group of n virtual machines. For example, during a first time step transaction #1 from network communications may be dispatched to the first VM in the group. During the second time step, the first transaction is dispatched to a second VM and a second transaction for the network communications serviced by the FTN is dispatched to the first VM, as shown in FIG. 3. In this way transactions for the multiple communication session may be serialized and deployed to the VMs in a pipelined fashion.

Figure 4:
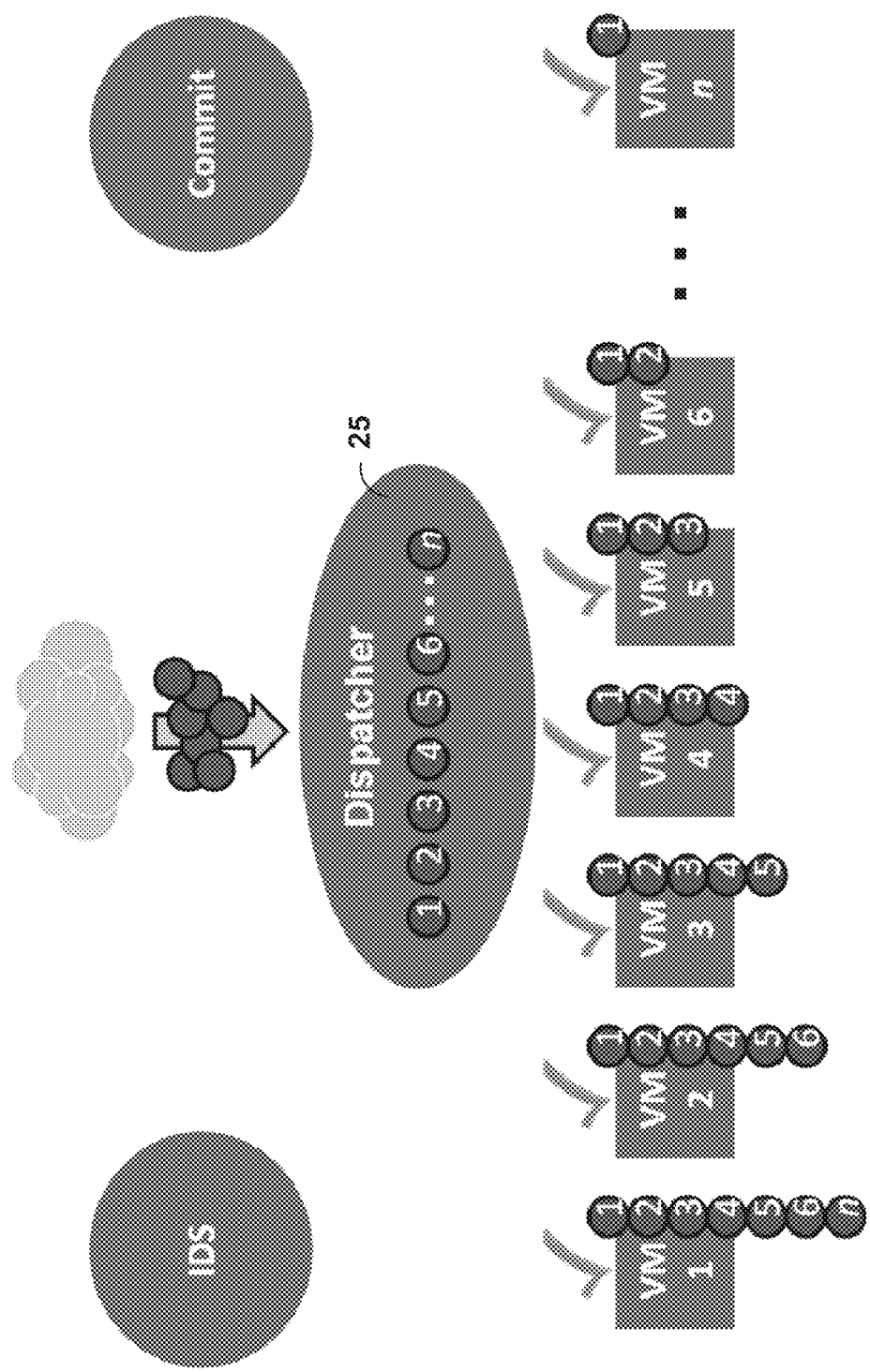
FIG. 4 is a diagram illustrating a subsequent state of the pipeline of VMs where the dispatcher has deployed n incoming transaction requests (#1-#n) over n timesteps to the set of VMs (1-n) so as to form a fully loaded pipeline of virtual machines.

FIG. 4 is a diagram illustrating a subsequent state of the pipeline of VMs where dispatcher 25 has deployed n incoming transaction requests (#1-#n) over n timesteps to the set of VMs (1-*n*) so as to form a fully loaded pipeline of virtual machines. At this point, all of the VMs are paused and validated with IDS checks for evidence of attack. In this example, no attack is detected (shown by checkmarks) and the full set of virtual machines is checkpointed at once.

Figure 5:
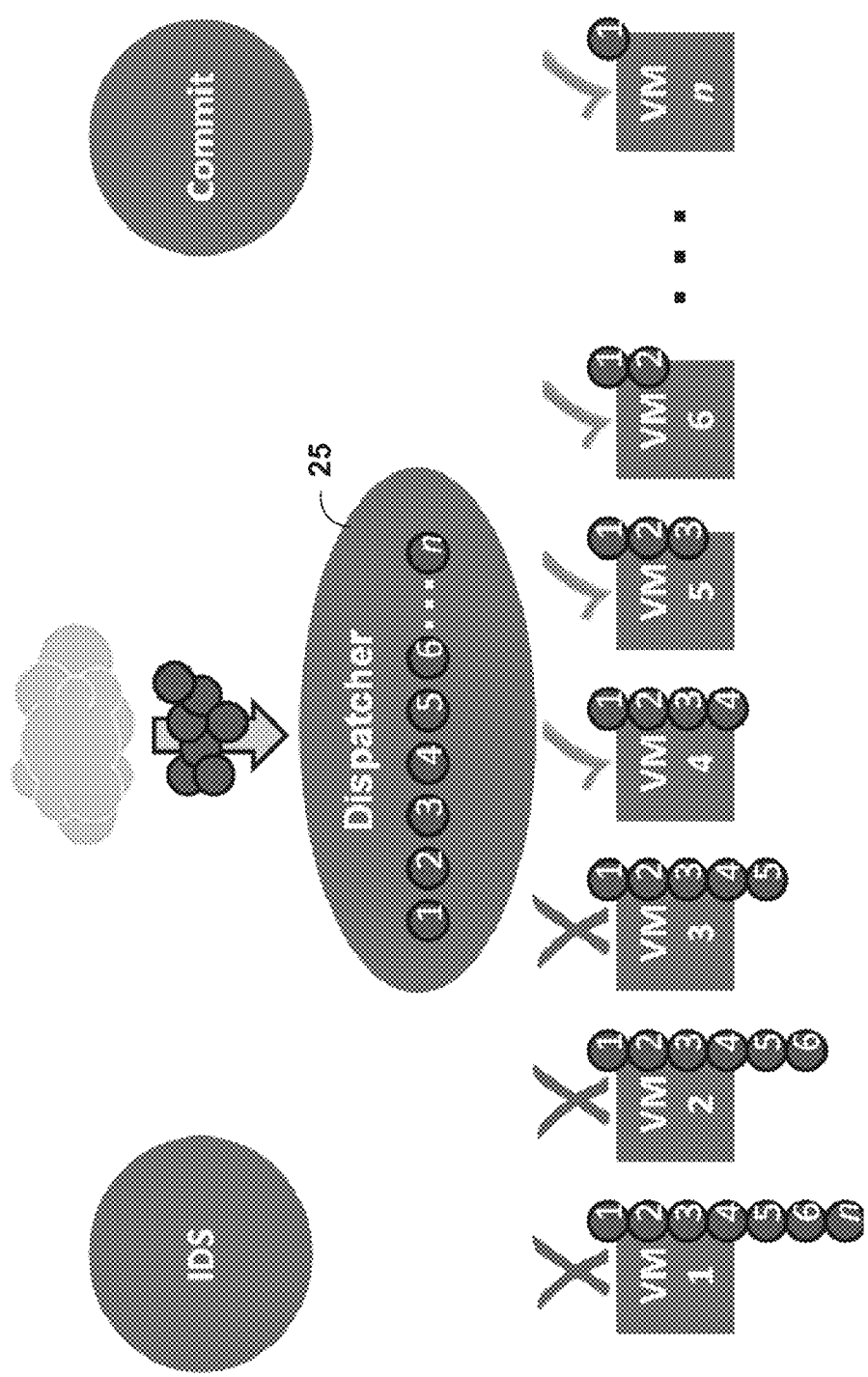
FIG. 5 is a diagram illustrating a subsequent state of the pipeline of VMs where the dispatcher has deployed a second set of n incoming transaction requests (#1-#n) over a second n timesteps to the set of VMs (1-n). In this example, VMs 1-3 are determined to be in a compromised state.

FIG. 5 is a diagram illustrating a subsequent state of the pipeline of VMs where dispatcher 25 has deployed a second set of n incoming transaction requests (#1-#n) over a second n timesteps to the set of VMs (1-*n*). In this example, VMs 1-3 are determined to be in a compromised state.

Figure 6:
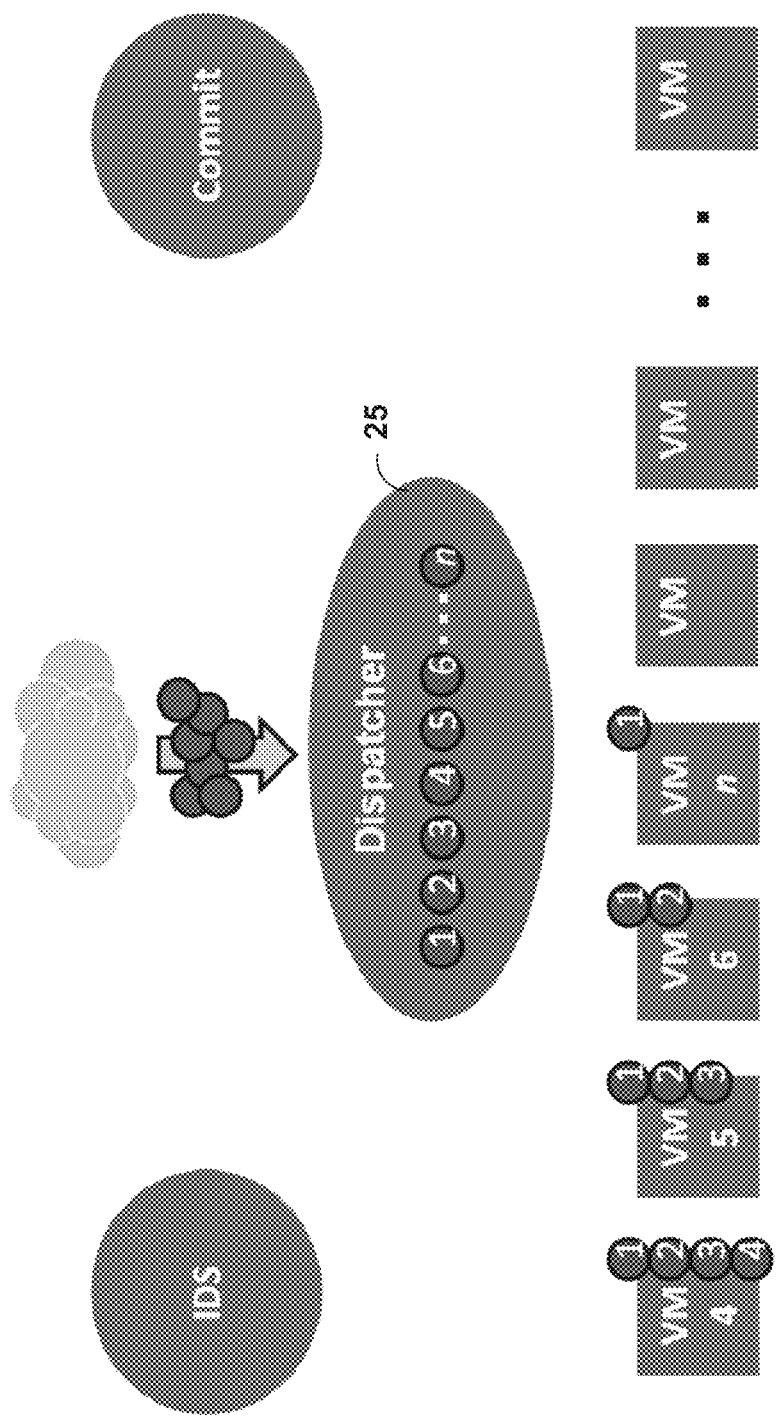
FIG. 6 is a diagram illustrating a subsequent state in which the compromised VMs 1-3 have been removed from the front-end of the pipeline.

FIG. 6 is a diagram illustrating a subsequent state in which the compromised VMs 1-3 have been removed from the front-end of the pipeline. Remaining VMS 4-*n* are promoted to earlier stages of the pipeline and new VMs are created at the tail end of the pipeline to once again form a pipeline of n VMs. The new VMs may be instantiated by the hypervisor and initialized with a most recent checkpointed state to ensure consistency. Compromised VMs 1-3 may be automatically isolated and their state saved for later forensic analysis of VMs.

In general, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a non-transitory computer-readable medium to store instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The program code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein, including one or more hardware-based microprocessors.

Various embodiments of the invention have been described. These and other embodiments are within the scope of the following claims.

The invention claimed is:

1. A method comprising:
    receiving, with a network node, a plurality of transaction requests from a plurality of network communication session with a plurality of clients;
    distributing a copy of each of the transaction requests to a plurality of virtual machines executing on the network node over a plurality of time steps to form a processing pipeline of the virtual machines;
    upon distributing a threshold number (n) of the transaction requests to the plurality of virtual machines, detecting whether any of the virtual machines in the processing pipeline has been compromised;
    when none of the virtual machines in the processing pipeline has been compromised, check-pointing the processing pipeline of virtual machines by recording a state for each of the plurality of virtual machines;
    when at least one of the virtual machines in the processing pipeline has been compromised, removing the compromised virtual machines from the processing pipeline; and
    reordering the processing pipeline by promoting the non-compromised virtual machines to earlier stages in the processing pipeline that correspond to stages associated with the removed virtual machines that have been compromised.

2. The method of claim 1, further comprising, instantiating new virtual machines and assigning the new virtual machines within stages previously associated with the non-compromised virtual machines that have been promoted to earlier stages in the processing pipeline.

3. The method of claim 2, further comprising initializing the new virtual machines to a state previously recorded when check-pointing the processing pipeline.

4. A network node comprising:
    a hardware-based processing system having a set of one or more processing units;
    a hypervisor executing on each one of the processing units;
    a plurality of virtual machines executing on each of the hypervisor;
    an application-level dispatcher to receive a plurality of transaction requests from a plurality of network communication session with a plurality of clients and distribute a copy of each of the transaction requests to the plurality of virtual machines executing on the network node over a plurality of time steps to form a processing pipeline of the virtual machines;
    one or more intrusion detection systems to detect whether any of the virtual machines in the processing pipeline has been compromised upon the distribution of a threshold number (n) of the transaction requests to the plurality of virtual machines by the dispatcher;
    a control module that coordinates with the hypervisor to checkpoint the processing pipeline of virtual machines by recording a state for each of the plurality of virtual machines when none of the virtual machines in the processing pipeline has been compromised,
    wherein, when at least one of the virtual machines in the processing pipeline has been compromised, the control module instructs the hypervisor to remove the compromised virtual machines from the processing pipeline and reorders the processing pipeline by promoting the non-compromised virtual machines to earlier stages in the processing pipeline that correspond to stages associated with the removed virtual machines.

5. The network node of claim 4, wherein the processing units include a plurality of processing units connected to the dispatcher by an unprivileged local area network within the network node and connected to the control unit by a privileged local area network within the network node.

6. The network node of claim 4, wherein the dispatcher provides a store-and-forward component that sends transaction requests to the worker VMs after each synchronization time step and sends responses to clients only after the IDS verifies worker VM integrity post-transaction.

7. The network node of claim 4, wherein the control unit instantiates new virtual machines and assigning the new virtual machines within stages previously associated with the non-compromised virtual machines that have been promoted to earlier stages in the processing pipeline.

8. The network node of claim 4, wherein the control unit initializing the new virtual machines to a state previously recorded when check-pointing the processing pipeline.

* * * * *